United States Patent
Auslender et al.

(10) Patent No.: US 11,310,833 B2
(45) Date of Patent: Apr. 19, 2022

(54) RACH PROCEDURE WITH TIMING ALIGNMENT

(71) Applicant: QUALCOMM Incorporated, San Diego, CA (US)

(72) Inventors: Ori Auslender, San Diego, CA (US); Ran Berliner, Kfar-Aviv (IL); Ambarish Tripathi, San Diego, CA (US); Junsheng Han, Sunnyvale, CA (US); Muhammad Nazmul Islam, Littleton, MA (US); Michael Levitsky, Rehovot (IL)

(73) Assignee: QUALCOMM, Incorporated, San Diego, CA (US)

( * ) Notice: Subject to any disclaimer, the term of this patent is extended or adjusted under 35 U.S.C. 154(b) by 126 days.

(21) Appl. No.: 16/556,146

(22) Filed: Aug. 29, 2019

(65) Prior Publication Data

US 2021/0068157 A1 Mar. 4, 2021

(51) Int. Cl.
*H04W 74/08* (2009.01)
*H04W 56/00* (2009.01)
*H04W 72/04* (2009.01)

(52) U.S. Cl.
CPC ..... *H04W 74/0833* (2013.01); *H04W 56/005* (2013.01); *H04W 72/046* (2013.01); *H04W 74/0891* (2013.01)

(58) Field of Classification Search
CPC ........... H04W 74/0833; H04W 56/005; H04W 74/0891; H04W 72/046
See application file for complete search history.

(56) References Cited

U.S. PATENT DOCUMENTS

| | | | | |
|---|---|---|---|---|
| 9,357,417 | B2* | 5/2016 | Siomina | H04W 36/0088 |
| 9,674,805 | B2* | 6/2017 | Jang | H04W 56/0045 |
| 10,624,070 | B2* | 4/2020 | Akkarakaran | H04W 72/14 |
| 2009/0300457 | A1 | 12/2009 | Kuo | |
| 2016/0242220 | A1* | 8/2016 | Jung | H04W 76/14 |
| 2016/0295537 | A1* | 10/2016 | Langereis | H04W 72/0413 |
| 2017/0201939 | A1* | 7/2017 | Lee | H04W 28/0231 |
| 2018/0007715 | A1 | 1/2018 | Lee et al. | |

(Continued)

FOREIGN PATENT DOCUMENTS

EP 2101538 A2 9/2009
WO 2017101048 A1 6/2017

OTHER PUBLICATIONS

Huawei, et al., "TA Value Adjustment for TAG," 3GPP Draft, 3GPP TSG-RAN WG2, Meeting #77, R2-120067, Dresden, Germany, Feb. 6-10, 2012, 4 pages . . . .
Mediatek Inc., "Discussion on Beam Recovery Mechanism," 3GPP Draft, 3GPP TSG RAN WG1, Meeting #88bis, R1-1704465, Spokane, USA, Apr. 3-7, 2017, 5 Pages.

(Continued)

*Primary Examiner* — Brian T O Connor
(74) *Attorney, Agent, or Firm* — Harrity & Harrity, LLP

(57) ABSTRACT

Various aspects of the present disclosure generally relate to wireless communication. In some aspects, a user equipment (UE) may determine to initiate a random access channel (RACH) procedure with a base station (BS). The UE may determine, based at least in part on determining to initiate the RACH procedure, whether a timing alignment timer, associated with a timing alignment of the UE and the BS, is expired. The UE may initiate the RACH procedure using the timing alignment based at least in part on determining that the timing alignment timer is not expired. Numerous other aspects are provided.

30 Claims, 11 Drawing Sheets

(56) References Cited

U.S. PATENT DOCUMENTS

| | | | |
|---|---|---|---|
| 2018/0049181 A1* | 2/2018 | Wu | H04W 48/12 |
| 2018/0213435 A1* | 7/2018 | Kim | H04L 47/2475 |
| 2018/0324675 A1* | 11/2018 | Lee | H04W 48/02 |
| 2019/0037423 A1* | 1/2019 | Yu | H04W 74/0833 |
| 2019/0053182 A1* | 2/2019 | Choi | H04W 48/12 |
| 2019/0053183 A1* | 2/2019 | Park | H04W 56/0005 |
| 2019/0074882 A1 | 3/2019 | Zhou et al. | |
| 2019/0394702 A1* | 12/2019 | Hoglund | H04W 76/38 |
| 2020/0383165 A1* | 12/2020 | Takahashi | H04W 72/046 |
| 2020/0413395 A1* | 12/2020 | Chen | H04W 74/00 |
| 2021/0013950 A1* | 1/2021 | Yang | H04W 72/0453 |
| 2021/0051708 A1* | 2/2021 | Agiwal | H04W 74/0833 |
| 2021/0058134 A1* | 2/2021 | Luo | H04W 74/0833 |
| 2021/0058799 A1* | 2/2021 | Chen | H04W 74/0833 |
| 2021/0185736 A1* | 6/2021 | Shi | H04W 74/004 |

OTHER PUBLICATIONS

Mediatek Inc., "Discussion on PRACH Design to Support Uplink Requests," 3GPP TSG RAN WG1, Meeting #89, R1-1707840, Hangzhou, P.R. China, May 15-19, 2017, 4 Pages.

International Search Report and Written Opinion—PCT/US2019/049139—ISAEPO—dated May 25, 2020.

Qualcomm Incorporated: "Beam Recovery Procedures", 3GPP Draft, 3GPP TSG-RAN WG1 NR#2, R1-1711161 Beam Recovery Procedures, 3rd Generation Partnership Project (3GPP), Mobile Competence Centre, 650, Route Des Lucioles, F-06921 Sophia-Antipolis Cedex, France, vol. RAN WG1, No. Qingdao, P.R. China, Jun. 27, 2017-Jun. 30, 2017, Jun. 26, 2017 (Jun. 26, 2017), XP051300361, pp. 1-5, Retrieved from the Internet: URL: http://www.3gpp.org/ftp/Meetings_3GPP_SYNC/RAN1/Docs/, [retrieved on Jun. 26, 2017], Sections: 2, 3.

* cited by examiner

RACH PROCEDURE WITH TIMING ALIGNMENT

FIELD OF THE DISCLOSURE

Aspects of the present disclosure generally relate to wireless communication and to techniques and apparatuses for random access channel (RACH) procedure with timing alignment.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNodeB (gNB), an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include determining to initiate a random access channel (RACH) procedure with a base station (BS); determining, based at least in part on determining to initiate the RACH procedure, whether a timing alignment timer, associated with a timing alignment of the UE and the BS, is expired; and initiating the RACH procedure using the timing alignment based at least in part on determining that the timing alignment timer is not expired.

In some aspects, a UE for wireless communication may include memory and one or more processors operatively coupled to the memory. The memory and the one or more processors may be configured to determine to initiate a RACH procedure with a BS; determine, based at least in part on determining to initiate the RACH procedure, whether a timing alignment timer, associated with a timing alignment of the UE and the BS, is expired; and initiate the RACH procedure using the timing alignment based at least in part on determining that the timing alignment timer is not expired.

In some aspects, a non-transitory computer-readable medium may store one or more instructions for wireless communication. The one or more instructions, when executed by one or more processors of a UE, may cause the one or more processors to determine to initiate a RACH procedure with a BS; determine, based at least in part on determining to initiate the RACH procedure, whether a timing alignment timer, associated with a timing alignment of the UE and the BS, is expired; and initiate the RACH procedure using the timing alignment based at least in part on determining that the timing alignment timer is not expired.

In some aspects, an apparatus for wireless communication may include means for determining to initiate a RACH procedure with a BS; means for determining, based at least in part on determining to initiate the RACH procedure, whether a timing alignment timer, associated with a timing alignment of the apparatus and the BS, is expired; and means for initiating the RACH procedure using the timing alignment based at least in part on determining that the timing alignment timer is not expired.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
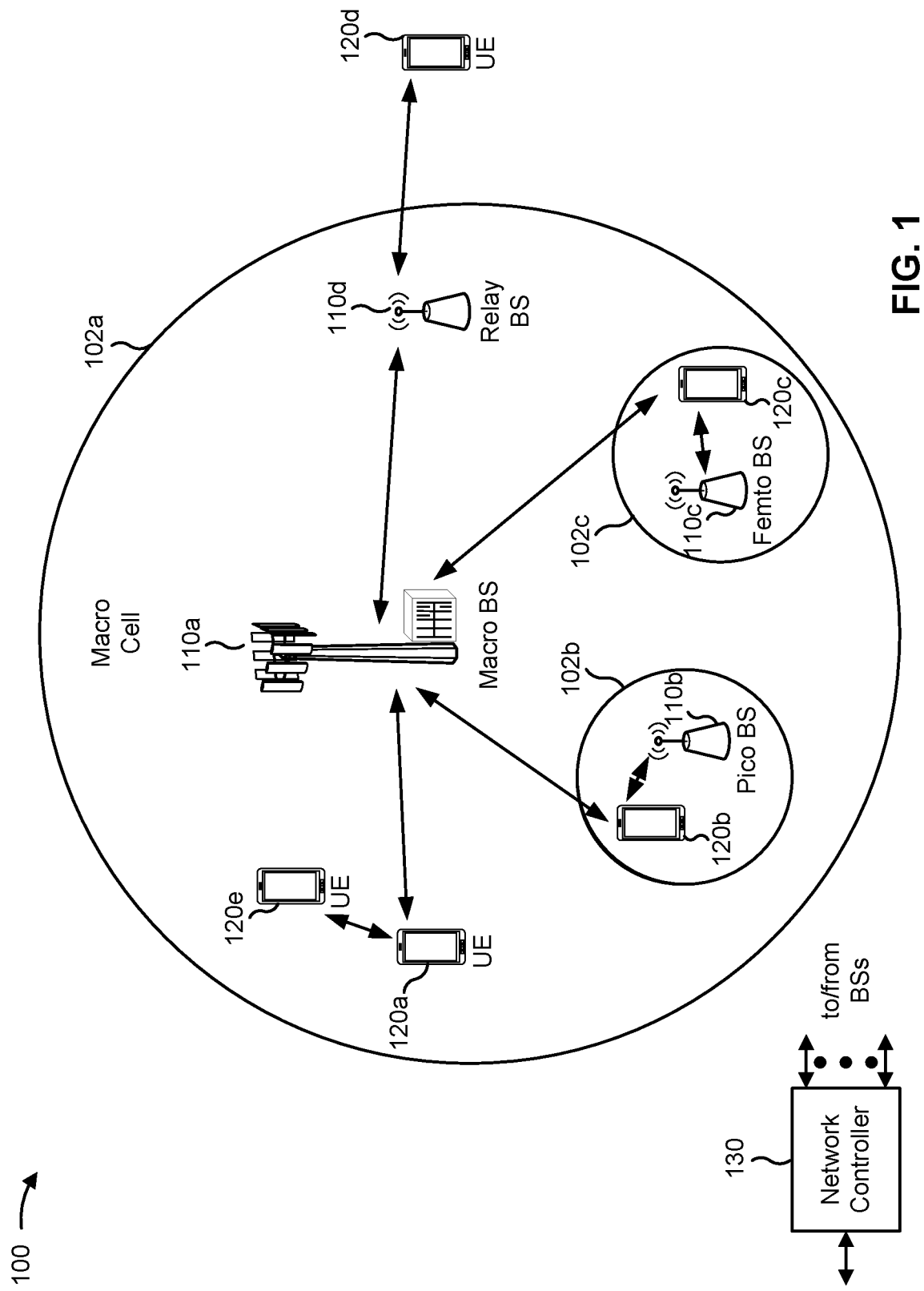
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. ABS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband Internet of Things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular Radio Access Technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
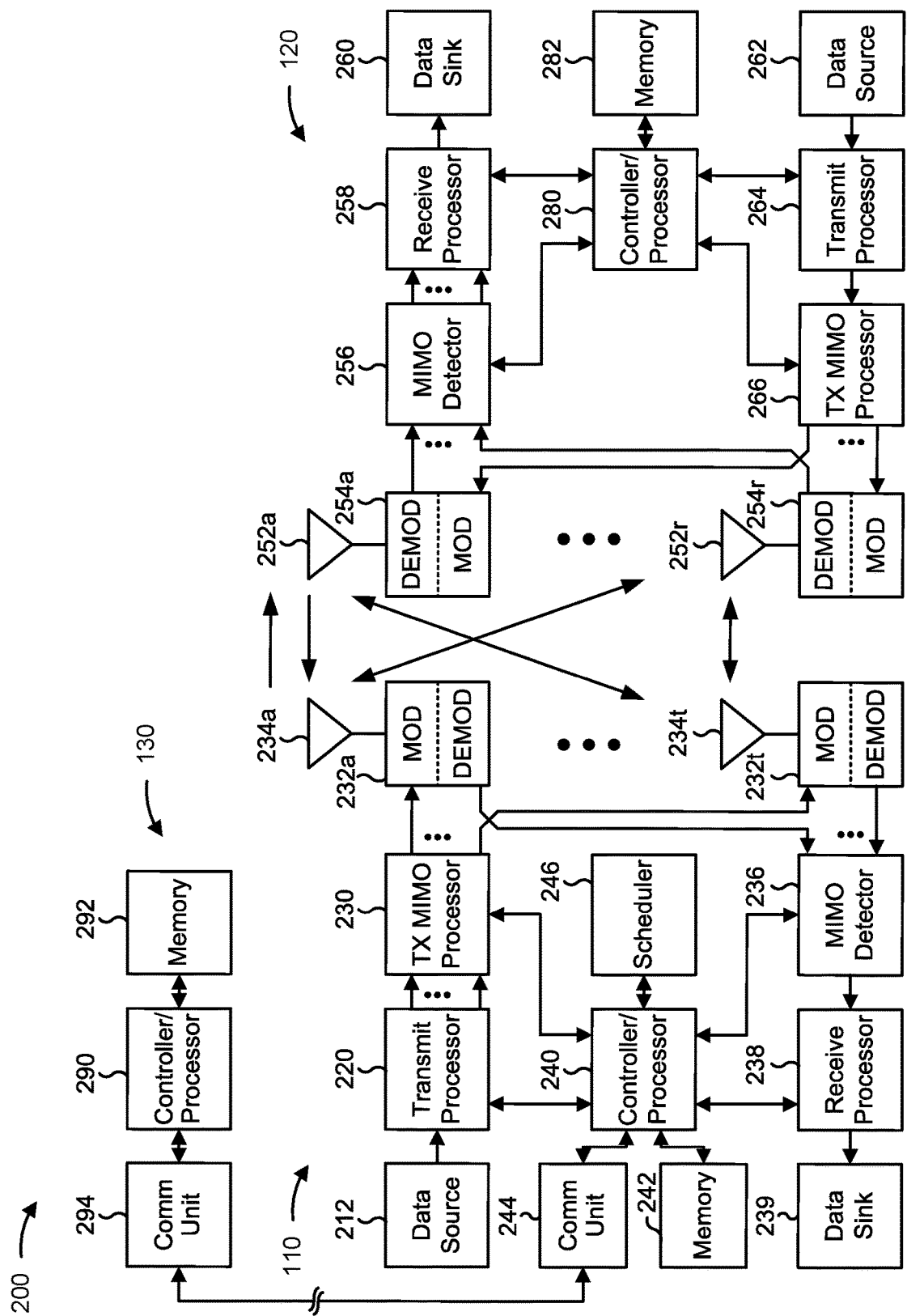
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with random access channel (RACH) procedure with timing alignment, as described in more detail elsewhere herein. For example, controller/processor 240 of base station 110, controller/processor 280 of UE 120, and/or any other component(s) of FIG. 2 may perform or direct operations of, for example, process 700 of FIG. 7 and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 700 of FIG. 7 and/or other processes as described herein. A scheduler 246 may schedule UEs for data transmission on the downlink and/or uplink.

In some aspects, UE 120 may include means for determining to initiate a RACH procedure with a BS 110, means for determining, based at least in part on determining to initiate the RACH procedure, whether a timing alignment timer, associated with a timing alignment of the UE and the BS, is expired, means for initiating the RACH procedure using the timing alignment based at least in part on determining that the timing alignment timer is not expired, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

Figure 3A:
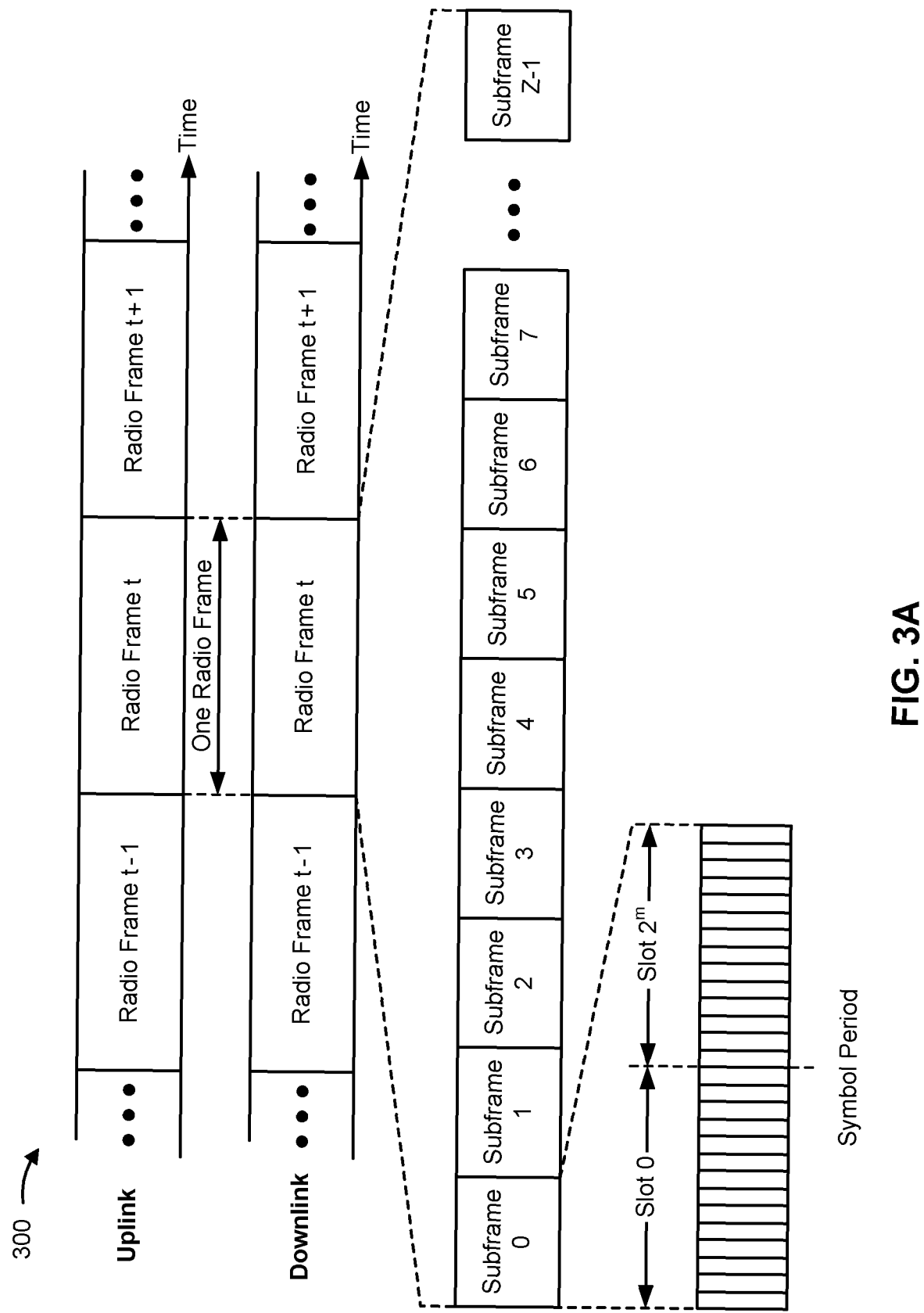
FIG. 3A is a block diagram conceptually illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may be frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
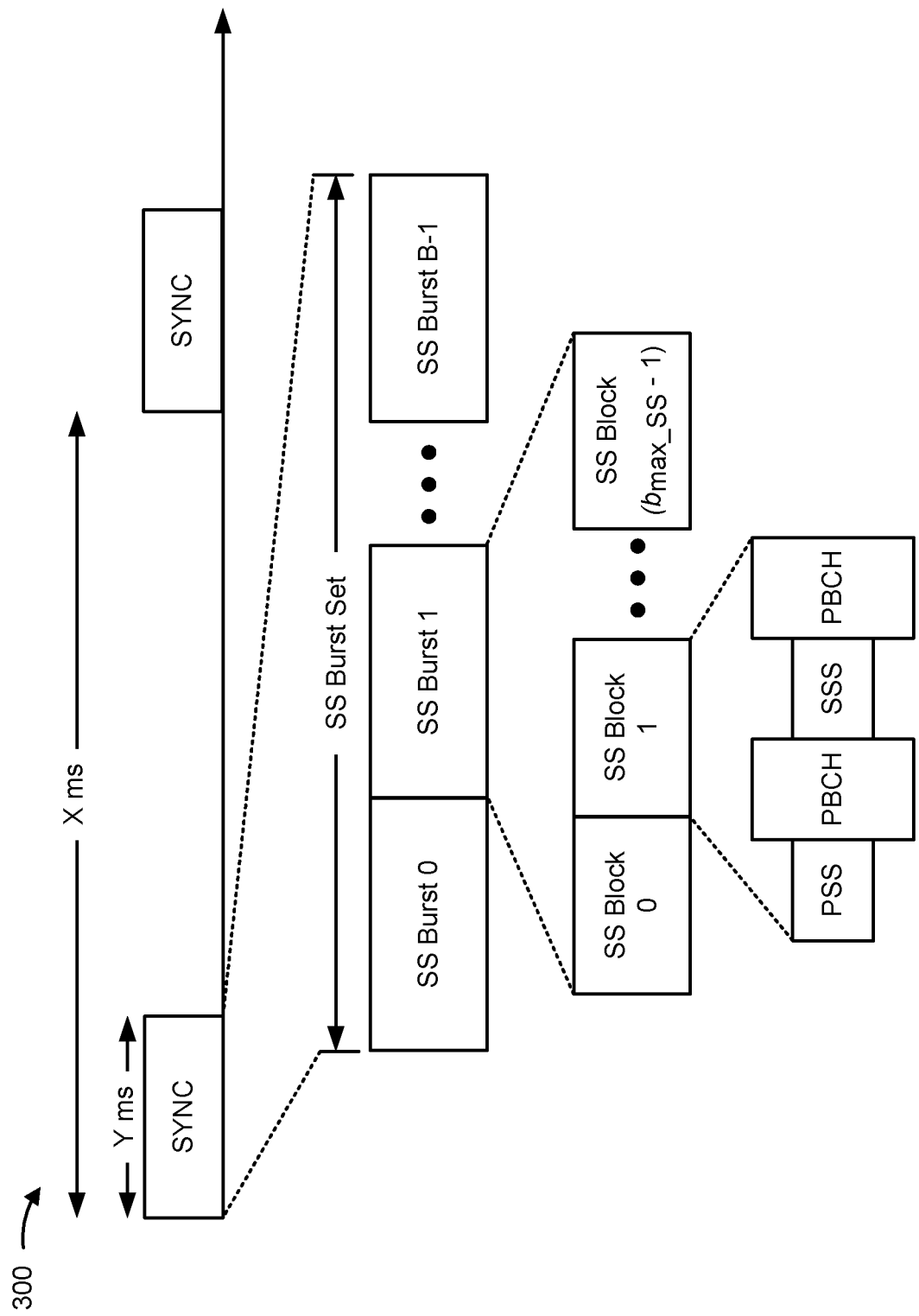
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station, such as 1 repetition, and/or the like). As further shown, each SS burst may include one or more SS blocks (identified as SS block 0 through SS block ($b_{max\_SS}-1$), where $b_{max\_SS}-1$ is a maximum number of SS blocks that can be carried by an SS burst, such as 64 for mmW deployments, 8 for sub-6 GHz deployments, and/or the like). In some aspects, different SS blocks may be beam-formed differently. An SS burst set may be periodically transmitted by a wireless node, such as every X milliseconds (e.g., 5 milliseconds, 10 milliseconds, 20 milliseconds, 40 milliseconds, 80 milliseconds), as shown in FIG. 3B. In some aspects, an SS burst set may have a fixed or dynamic length, shown as Y milliseconds (e.g., 5 milliseconds and/or the like) in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods (e.g., 1-3 symbol periods and/or the like) of a slot, where C may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

Figure 4:
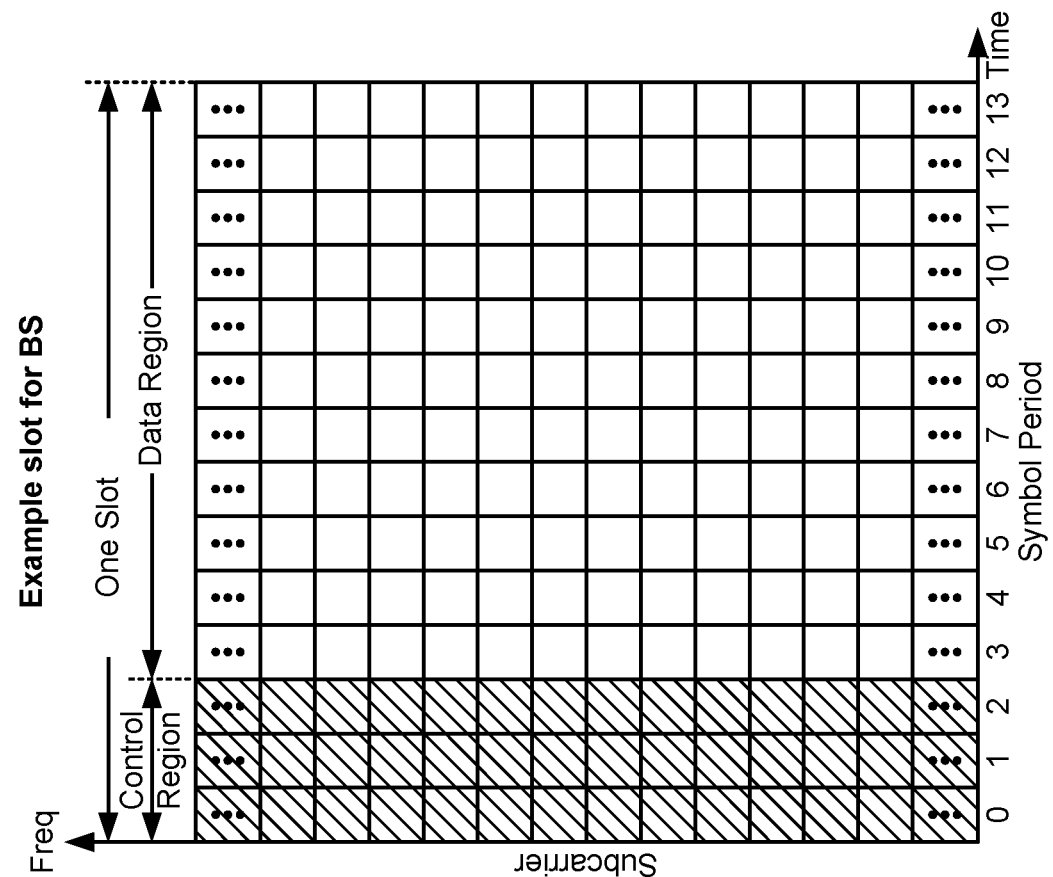
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where q∈{0, . . . , Q−1}.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SNIR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive machine-type communication (mMTC) targeting non-backward compatible machine-type communication (MTC) techniques, and/or mission critical targeting ultra reliable low latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include downlink and/or uplink data as well as downlink and/or uplink control signals.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such as central units or distributed units.

As indicated above, FIG. 4 is provided as an example. Other examples may differ from what is described with regard to FIG. 4.

A UE may access a wireless network by negotiating a connection with a BS included in the wireless network. During connection establishment, the UE and the BS may synchronize the connection in the downlink direction (that is, from BS to UE) and in the uplink direction (that is, from UE to BS).

To synchronize the connection in the downlink direction, the UE may read a synchronization signal block (SSB) that includes various synchronization signals transmitted from the BS. The synchronization signals may include a primary synchronization signal (PSS), a secondary synchronization signal (SSS), a primary broadcast channel (PBCH), and/or the like. The UE may use the PSS to determine symbol timing in the downlink direction, and may use the SSS to determine a physical cell identifier associated with the BS, and may use the PBCH to determine the frame timing.

To synchronize the connection in the uplink direction, the UE and the BS may perform a random access channel (RACH) procedure. In some aspects, the UE and the BS may perform a four-step RACH procedure. In a four-step RACH procedure, the UE and the BS may exchange four primary RACH communications. The UE may transmit a message 1 (msg1) communication to the BS (e.g., as defined in a 3GPP four-step RACH procedure). The msg1 communication may be a RACH preamble communication that is transmitted in a RACH occasion (e.g., a particular set of time-frequency resources), the combination of which may be referred to as a RACH signature. The BS may respond to the msg1 communication with a message 2 (msg2) communication (e.g., as defined in a 3GPP four-step RACH procedure), which be include a random access response (RAR) communication. The UE may respond to the msg2 communication with a message 3 (msg3) communication (e.g., as defined in a 3GPP four-step RACH procedure), which may be a radio resource control (RRC) connection request communication. The BS may respond to the msg3 communication with a message 4 (msg4) communication (e.g., as defined in a 3GPP four-step RACH procedure), which may be a medium access control (MAC) control element (MAC-CE) contention resolution identifier communication and may include an RRCSetup command, and/or the like.

In some cases, the four-step RACH procedure may not meet the low latency requirements of 5G/NR wireless systems. Accordingly, the UE and the BS may use a two-step RACH procedure to reduce latency in synchronizing the connection in the uplink direction. In a two-step RACH procedure, the UE may combine the msg1 communication and the msg3 communication into a communication referred to as a message A (msgA) communication (e.g., as defined in a 3GPP two-step RACH procedure). The msg1 portion of the msgA communication may be referred to as the preamble portion of the msgA communication. The msg3 portion of the msgA communication may be referred to as the payload portion of the msgA communication. The UE may transmit the msg1 portion and the msg3 portion sequentially and prior to receiving the msg2 communication and the msg4 communication. The BS may receive the msgA communication and may transmit a message B (msgB) communication (e.g., as defined in a 3GPP four-step RACH procedure), which may include the msg2 communication and the msg4 communication.

During and/or after the RACH procedure, the BS may configure the UE with a timing alignment for a wireless communication link between the UE and the BS. The timing alignment may identify a timing offset or gap between a downlink and an uplink of the wireless communication link. In this way, the UE may use the timing alignment to synchronize timing between transmitting and receiving communications on the wireless communication link.

In some cases, once a timing alignment has been established for the UE and the BS, the UE may subsequently determine to initiate another RACH procedure with the BS. In this case, the UE may be instructed to, and/or may be configured to, release or reset the timing alignment with the BS prior to initiating the RACH procedure. As a result, the UE may initiate the RACH procedure without a timing alignment, which may cause transmission and/or reception timing issues during the RACH procedure. For example, the lack of timing alignment may cause the RACH preamble transmitted by the UE to arrive at the BS outside of a scheduled timing window for receiving RACH preambles. As a result, the BS may not receive the RACH preamble, may experience difficulties in decoding and reading the RACH preamble, may cause a mismatch between the random access preamble identifier (RAPID) of the RACH preamble transmitted by the UE and the RAPID determined by the BS, and/or the like, which may cause delays in the RACH procedure, may cause the RACH procedure to fail, and/or the like.

Some aspects, described herein, provide techniques and apparatuses for RACH procedure with timing alignment. In some aspects, the UE may determine to initiate a RACH procedure with the BS. For example, the UE may detect a beam failure of a serving beam (e.g., a beam that has been established for communication with the BS and is in use by the UE for communication out of other established beams) and may initiate the RACH procedure for beam failure recovery (BFR). As another example, the UE may determine that the UE is not configured with a scheduling request (SR) resource and may initiate the RACH procedure to obtain a grant for uplink transmission (e.g., an uplink grant) from the BS, an SR resource from the BS, and/or the like. In this case, the UE may determine whether a timing alignment timer, associated with a timing alignment of the UE and the BS, is expired. If the UE determines that the timing alignment timer is not expired, the UE may initiate the RACH procedure using the timing alignment.

In this way, the UE and the BS may perform the RACH procedure with the timing alignment, which reduces the likelihood that the BS may not receive a RACH preamble transmitted by the UE, may reduce decoding issues with the RACH preamble, may reduce RAPID mismatches, and/or the like, which may reduce delays in the RACH procedure, may reduce RACH procedure failures, and/or the like. Moreover, maintaining the timing alignment when performing the RACH procedure may improve RACH procedure performance for UEs that are located at or near a cell edge of a BS in that the timing alignment may help mitigate RACH preamble cyclic shift issues that may occur due to large round-trip times (RTTs). In this case, the timing alignment may permit the BS to be configured with larger cell sizes.

Figure 5A:
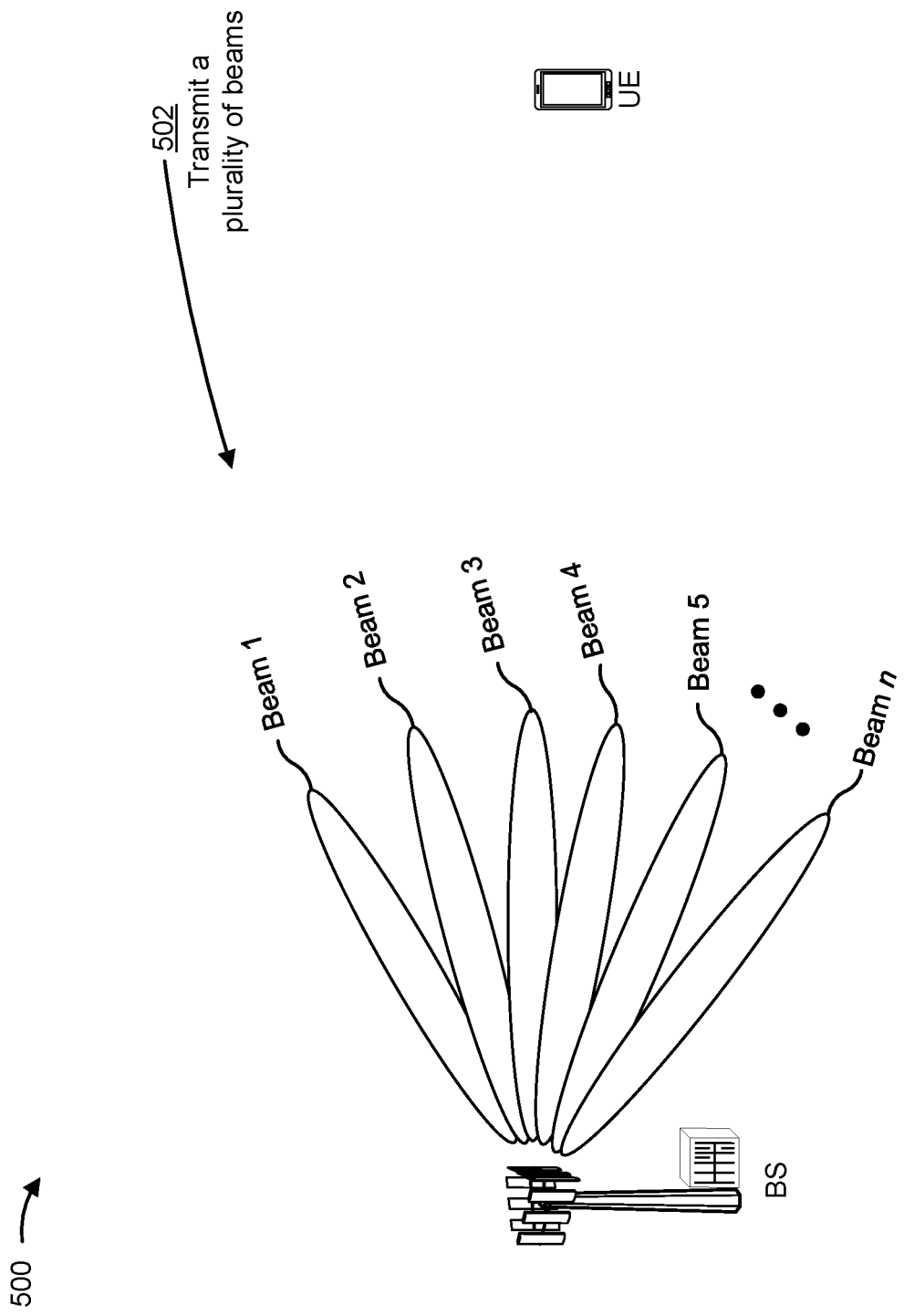
FIGS. 5A-5C, 6A, and 6B are diagrams illustrating examples of random access channel (RACH) procedure with timing alignment, in accordance with various aspects of the present disclosure.
Figure 5B:
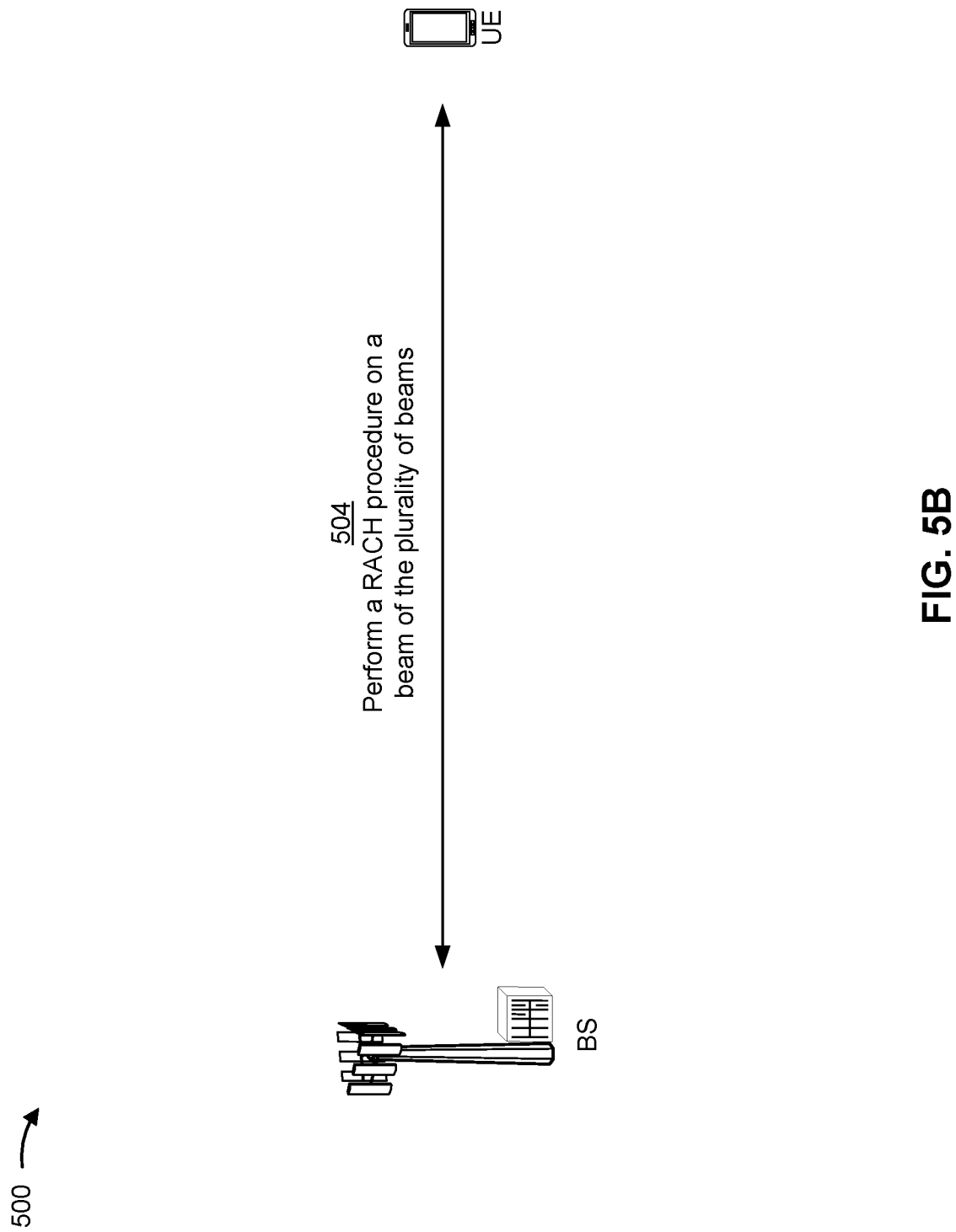
Figure 5C:
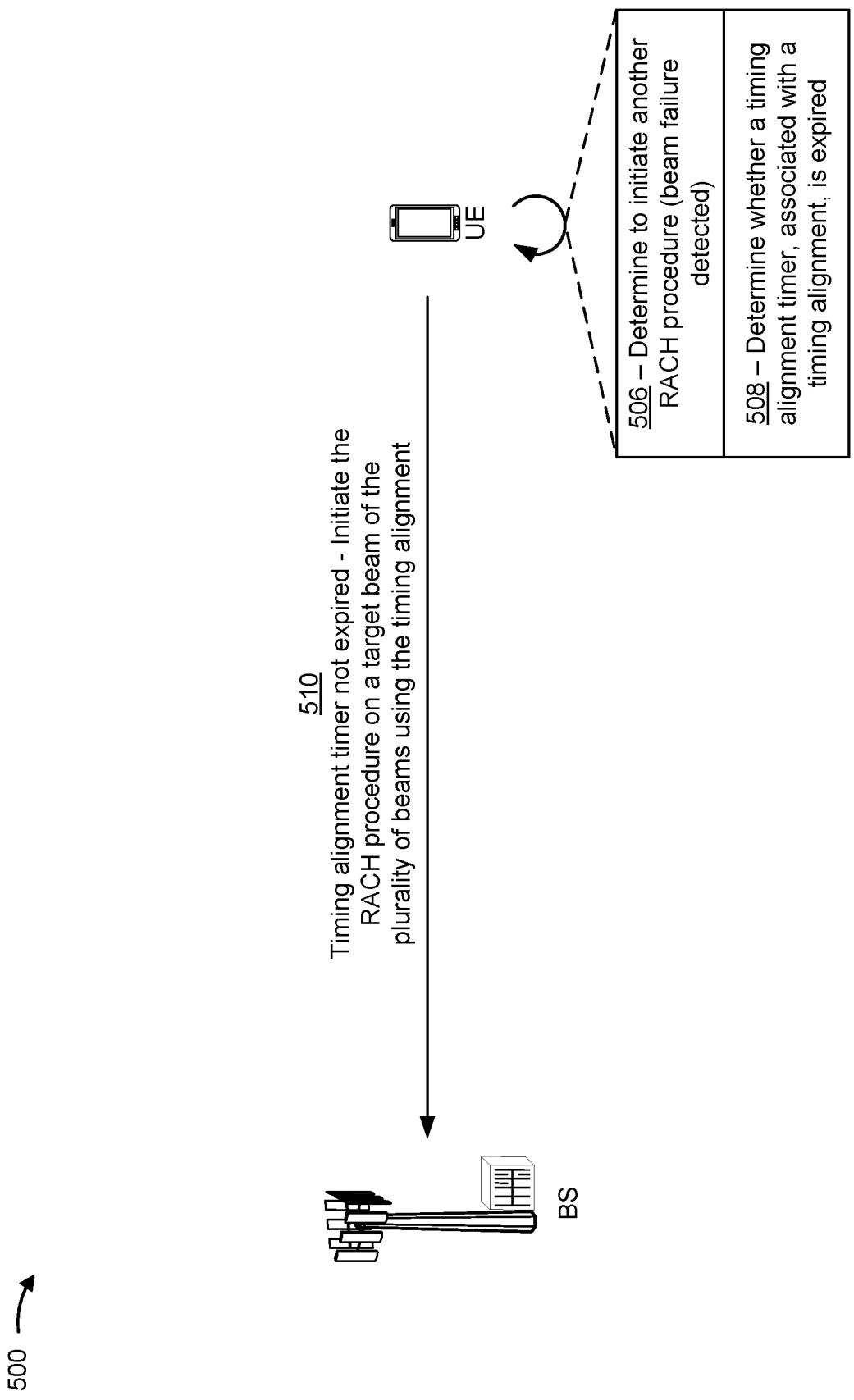

FIGS. 5A-5C are diagrams illustrating one or more examples 500 of RACH procedure with timing alignment, in accordance with various aspects of the present disclosure. As shown in FIGS. 5A-5C, the one or more examples 500 may include communication between a UE (e.g., UE 120) and a BS (e.g., BS 110). In some aspects, the BS and the UE may be included in a wireless network (e.g., wireless network 100) and may communicate using a frame structure (e.g., frame structure 300 and/or another frame structure), a slot format (e.g., slot format 410 and/or another slot format), and/or the like.

As shown in FIG. 5A, and by reference number 502, the BS may transmit a plurality of beams (e.g., Beam 1 through Beam n, which may include, for example, 64 beams for mmW, and/or the like). In some aspects, a subset of the plurality of beams may be used for contention-free RACH procedures (e.g., where the UE is assigned a cell random access temporary identifier (C-RNTI) associated with the BS and/or the UE and/or the like) and another subset of the plurality of beams may be used for contention-free and contention-based RACH procedures (e.g., where the UE is communicatively connecting to the BS for the first time after a restart, and/or the like).

As shown in FIG. 5B, and by reference number 504, the BS and the UE may establish a connection on a wireless communication link by performing a RACH procedure, such as a four-step RACH procedure, a two-step RACH procedure, and/or the like. For example, the UE may initiate the RACH procedure by selecting a beam of the plurality of beams transmitted by the BS and transmitting, to the BS, a RACH communication using the selected beam. The RACH communication may include a msg1 communication in a four-step RACH procedure, a msgA communication in the two-step RACH procedure, and/or the like.

In some aspects, the UE may select the beam from the plurality of beams based at least in part on performing one or more measurements (e.g., an RSRP measurement, an RSSI measurement, an RSRQ measurement, a latency measurement, a transmission timing measurement, and/or the like) of the plurality of beams (e.g., of the synchronization signals and/or reference signals transmitted on the plurality of beams). In some aspects, the UE may select the beam based at least in part on determining that the one or more measurements associated with a particular beam satisfies one or more corresponding measurement thresholds. In some aspects, the UE may select the beam based at least in part on determining that the beam produces the highest and/or best measurements (e.g., based at least in part on determining that the beam produces the best RSRP measurement, the best RSSI measurement, the best RSRQ measurement, the best latency measurement, the best transmission timing measurement, and/or the like) of the plurality of beams. In some aspects, the beam on which the UE initiates the RACH procedure may become the serving beam of the UE.

In some aspects, the UE may select a RACH signature (e.g., a RACH occasion and a RACH preamble in the RACH occasion) associated with the beam for the RACH communication. The RACH signature may be used to uniquely identify the UE during the RACH procedure (e.g., by a unique combination of a RACH occasion and a RACH preamble). In some aspects, the UE may select the RACH occasion from a plurality of RACH occasions configured for the beam. Moreover, the UE may select the RACH preamble from a plurality of RACH preambles configured for the RACH occasion.

In some aspects, while the UE and the BS continue to perform the RACH procedure and/or after the RACH procedure is complete, the UE may continue to measure the plurality of beams. In this way, the UE may generate and maintain a data structure (e.g., a database, a table, and/or the like) in which the UE may track the plurality of beams. The data structure may include information identifying the plurality of beams, information identifying one or more measurements associated with the plurality of beams, and/or the like. The one or more measurements may include RSRP measurements, RSSI measurements, RSRQ measurements, latency measurements, timing offset measurements (e.g., a measurement of a timing offset between the serving beam and another beam of the plurality of beams), and/or the like. Accordingly, if a beam failure occurs with the serving beam of the UE, the UE may select a target beam, on which to perform a BFR procedure, from the plurality of beams based at least in part on the data structure.

Moreover, during and/or after the RACH procedure, the BS may configure the UE with a timing alignment for the wireless communication link between the UE and the BS. For example, the BS may configure the UE with the timing alignment by transmitting an indication of the timing alignment to the UE in a timing alignment command and/or another type of communication. The timing alignment may identify a timing offset or gap between a downlink and an uplink of the wireless communication link. The BS may transmit additional timing alignment commands and/or other communications that configure and/or instruct the UE to adjust the timing alignment (e.g., to adjust the timing offset or gap between a downlink and an uplink).

The UE may initiate a timing alignment timer based at least in part on receiving an indication of a timing alignment and/or an indication of an adjustment to a timing alignment. The timing alignment timer may indicate a time duration during which the timing alignment is valid and usable. In this way, the UE may use the timing alignment, while the timing alignment timer is not expired, to synchronize timing between transmitting and receiving communications on the wireless communication link. If the timing alignment timer expires, the UE may discard and/or reset the timing alignment, may perform another RACH procedure to reestablish the timing alignment, and/or the like.

As shown in FIG. 5C, and by reference number 506, once the UE and the BS have established a timing alignment, the UE may subsequently determine to initiate another RACH procedure. For example, the UE may determine to initiate another RACH procedure based at least in part on detecting a beam failure associated with the serving beam of the UE. Beam failure may include when the UE detects that the BS has dropped the beam, determines that the one or more measurements associated with the serving beam no longer satisfy the one or more corresponding measurement thresholds, and/or the like.

In this case, the UE may determine to initiate another RACH procedure as part of BFR procedure, which may include a procedure to recover from the failure of the serving beam. For example, the BFR procedure may include identifying a target beam (e.g., a beam that is different from the failed serving beam, and to which the UE is to switch the wireless communication from the failed serving beam), initiating a RACH procedure on the target beam, and/or the like. The UE may identify the target beam based at least in part on the data structure in which the UE tracks the plurality of beams associated with the BS. For example, the UE may determine the next best beam for the UE based at least in part on tracking the one or more measurements for the plurality of beams in the data structure, may select the target beam based at least in part on determining that the one or more measurements for the target beam satisfy the one or more corresponding thresholds, and/or the like.

As further shown in FIG. 5C, and by reference number 508, prior to initiating the RACH procedure on the target beam, the UE may determine whether a timing alignment timer, associated with the timing alignment of the UE and the BS, is expired. If the timing alignment timer is expired, the UE may discard or reset the timing alignment of the UE and the BS prior to initiating the RACH procedure such that the RACH procedure is performed without a timing alignment. However, if the UE determines that the timing alignment timer has not expired (and thus, the timing alignment of the BS and the UE is still valid), the UE may determine to maintain the timing alignment and to initiate the RACH procedure on the target beam using the timing alignment.

As further shown in FIG. 5C, and by reference number 510, the UE may initiate the RACH procedure on the target beam and using the timing alignment based at least in part on determining that the timing alignment timer is not expired. In this case, the UE may initiate the RACH procedure by transmitting, to the BS, a RACH communication (e.g., a msg1 communication in a four-step RACH procedure, a msgA communication in the two-step RACH procedure, and/or the like) using the target beam and based at least in part on the timing alignment. For example, the UE may adjust the transmission timing of the RACH communication based at least in part on the timing offset or gap between a downlink and an uplink of the wireless communication link indicated by the timing alignment. Moreover, the UE may adjust a downlink timing for receiving RACH communications from the BS during the RACH procedure.

The UE may select a RACH signature (e.g., a RACH occasion and a RACH preamble in the RACH occasion) associated with the target beam for the RACH communication. The RACH signature may be used to uniquely identify the UE during the RACH procedure. In some aspects, the UE may select the RACH occasion from a plurality of RACH occasions configured for the target beam. Moreover, the UE may select the RACH preamble from a plurality of RACH preambles configured for the RACH occasion.

In some aspects, the timing alignment of the BS and the UE may be associated with the serving beam. Accordingly, when the UE initiates the RACH procedure on the target beam, the UE may adjust the timing alignment of the serving beam for the target beam. In this case, the UE may adjust the timing alignment based at least in part on the data structure that the UE maintains for tracking the plurality of beams associated with the BS. For example, the UE may adjust the timing alignment based at least in part on a timing offset between the serving beam and the target beam indicated in the data structure. The UE may adjust the timing alignment by adjusting a downlink timing of the timing alignment based at least in part on the timing offset, by adjusting an uplink timing of the timing alignment based at least in part on the timing offset, and/or the like. In this way, the UE may further increase the accuracy of the timing alignment for the RACH procedure, which may further increase the performance and reliability of the RACH procedure.

In this way, the UE may determine to initiate a RACH procedure with the BS and may determine whether a timing alignment timer, associated with a timing alignment of the UE and the BS, is expired. If the UE determines that the timing alignment timer is not expired, the UE may initiate the RACH procedure using the timing alignment. In this way, the UE and the BS may perform the RACH procedure with the timing alignment, which reduces the likelihood that the BS may not receive a RACH preamble transmitted by the UE, may reduce decoding issues with the RACH preamble, may reduce RAPID mismatches, and/or the like, which may reduce delays in the RACH procedure, may reduce RACH procedure failures, and/or the like. Moreover, maintaining the timing alignment when performing the RACH procedure may improve RACH procedure performance for UEs that are located at or near a cell edge of a BS in that the timing alignment may help mitigate RACH preamble cyclic shift issues that may occur due to large RTTs. In this case, the timing alignment may permit the BS to be configured with larger cell sizes.

As indicated above, FIGS. 5A-5C are provided as one or more examples. Other examples may differ from what is described with respect to FIGS. 5A-5C. For example, the actions and techniques described in connection with one or more of reference numbers 502-510 may be performed for RACH procedures in situations other than for beam failure recovery. For example, the actions and techniques described in connection with one or more of reference numbers 502-510 may be performed for any RACH procedure in which the UE may already be configured with a timing alignment.

Figure 6A:
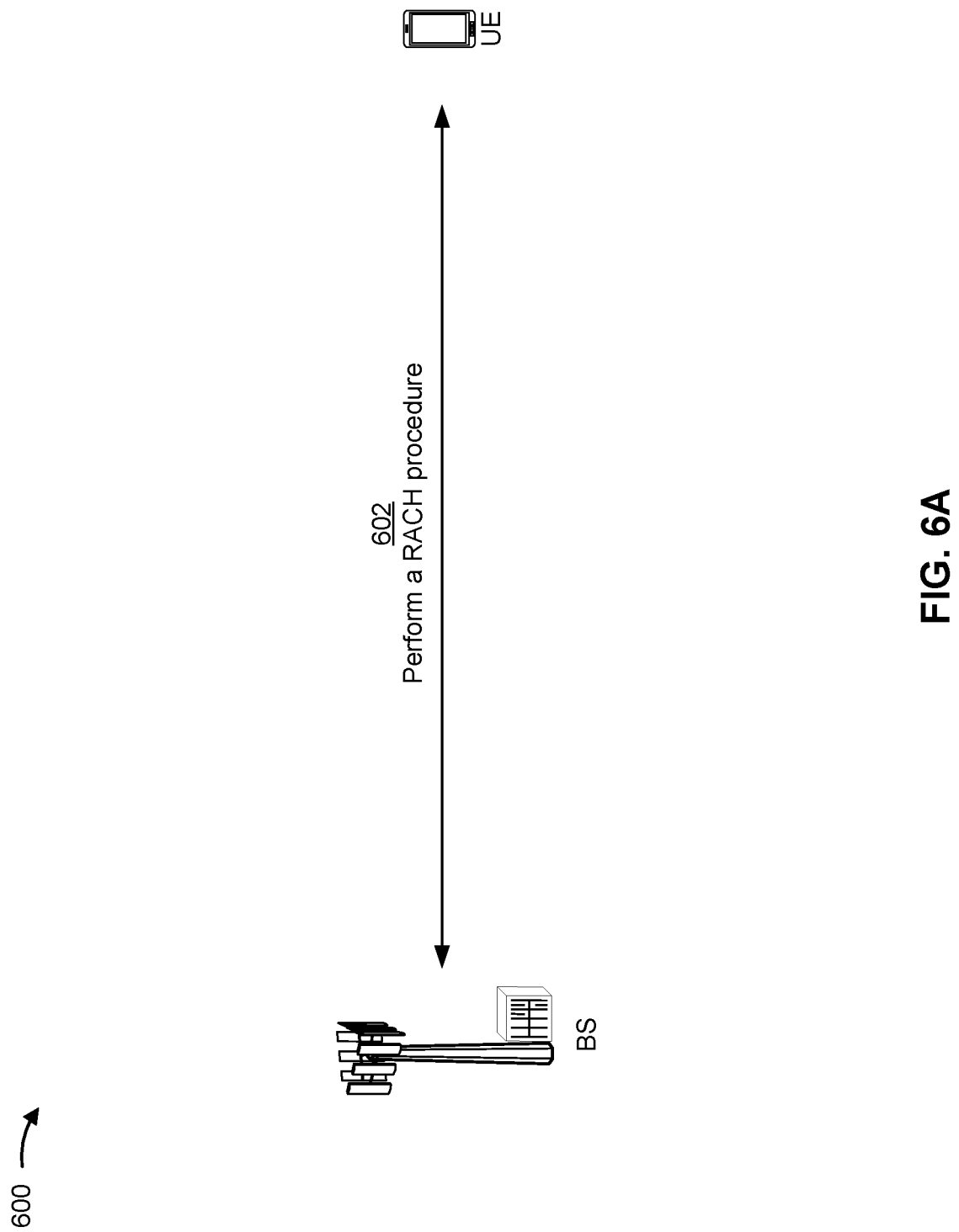
Figure 6B:
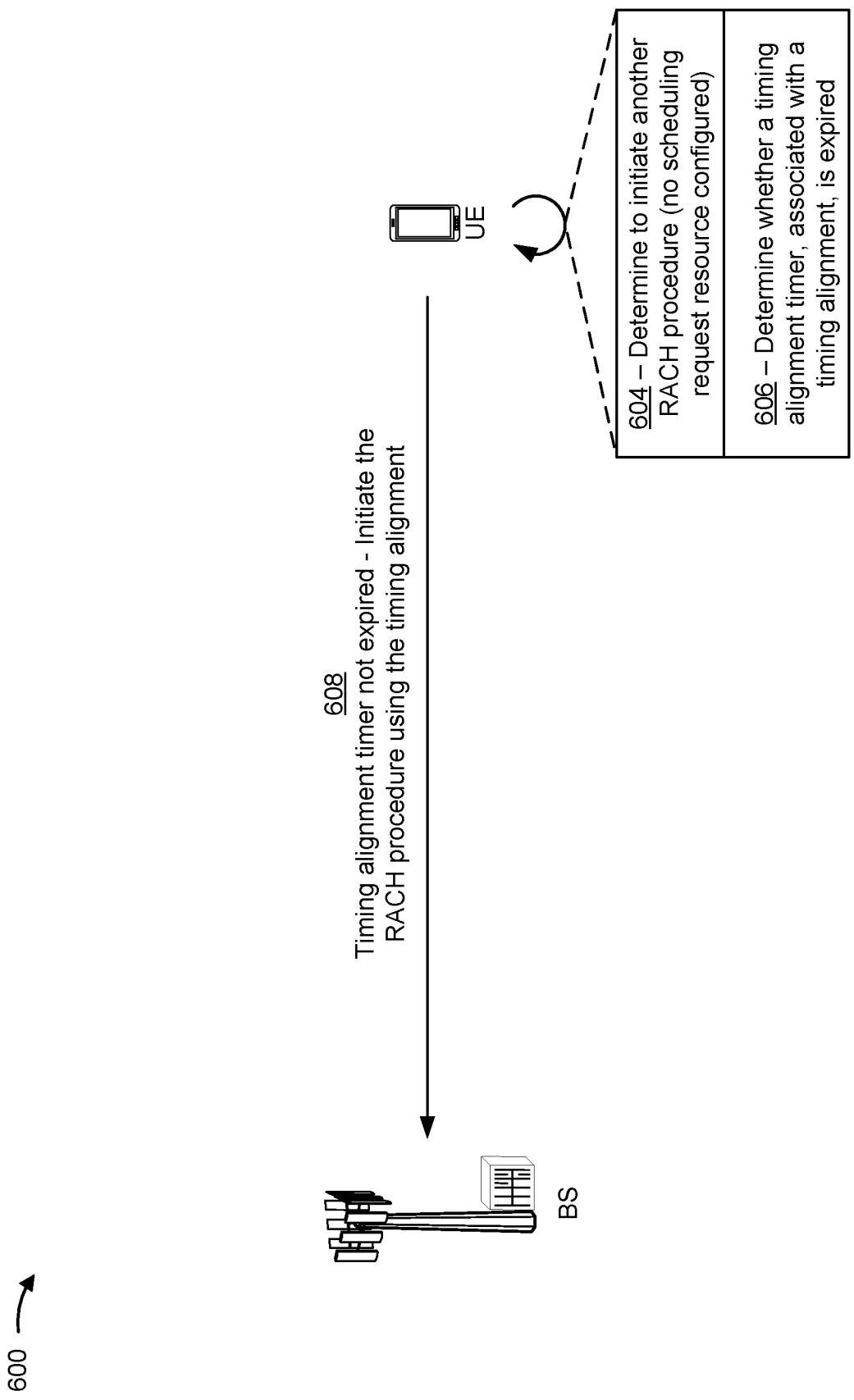

FIGS. 6A and 6B are diagrams illustrating one or more examples 600 of RACH procedure with timing alignment, in accordance with various aspects of the present disclosure. As shown in FIGS. 6A and 6B, the one or more examples 600 may include communication between a UE (e.g., UE 120) and a BS (e.g., BS 110). In some aspects, the BS and the UE may be included in a wireless network (e.g., wireless network 100) and may communicate using a frame structure (e.g., frame structure 300 and/or another frame structure), a slot format (e.g., slot format 410 and/or another slot format), and/or the like.

As shown in FIG. 6A, and by reference number 602, the BS and the UE may establish a connection on a wireless communication link by performing a RACH procedure, such as a four-step RACH procedure, a two-step RACH procedure, and/or the like. For example, the UE may initiate the RACH procedure by transmitting a RACH communication to the BS. The RACH communication may include a msg1 communication in a four-step RACH procedure, a msgA communication in the two-step RACH procedure, and/or the like. In some aspects, the UE may select a RACH signature (e.g., a RACH occasion and a RACH preamble in the RACH occasion) for the RACH communication. The RACH signature may be used to uniquely identify the UE during the RACH procedure. In some aspects, the UE may select the RACH occasion from a plurality of RACH occasions configured for the BS. Moreover, the UE may select the RACH preamble from a plurality of RACH preambles configured for the RACH occasion.

During and/or after the RACH procedure, the BS may configure the UE with an SR resource. The UE may use the SR resource to transmit scheduling requests to the BS to request uplink resources for transmitting communications to the BS. Moreover, during and/or after the RACH procedure, the BS may configure the UE with a timing alignment for the wireless communication link between the UE and the BS. For example, the BS may configure the UE with the timing alignment by transmitting an indication of the timing alignment to the UE in a timing alignment command and/or another type of communication. The timing alignment may identify a timing offset or gap between a downlink and an uplink of the wireless communication link. The BS may transmit additional timing alignment commands and/or other communications that configure and/or instruct the UE to adjust the timing alignment (e.g., to adjust the timing offset or gap between a downlink and an uplink).

The UE may initiate a timing alignment timer based at least in part on receiving an indication of a timing alignment and/or an indication of an adjustment to a timing alignment. The timing alignment timer may indicate a time duration during which the timing alignment is valid and usable. In this way, the UE may use the timing alignment, while the timing alignment timer is not expired, to synchronize timing between transmitting and receiving communications on the wireless communication link. If the timing alignment timer expires, the UE may discard and/or reset the timing alignment, may perform another RACH procedure to reestablish the timing alignment, and/or the like.

As shown in FIG. 6B, and by reference number 604, once the UE and the BS have established a timing alignment, the UE may subsequently determine to initiate another RACH procedure. For example, the UE may determine to initiate another RACH procedure based at least in part on determining that no SR resource is configured for the UE. For example, the UE may determine that the UE has not been configured with an SR resource, may determine that a previously configured SR resource has expired, and/or the like. In this case, the UE may determine to initiate the RACH procedure to obtain a grant for uplink transmission (e.g., an uplink grant) from the BS.

As further shown in FIG. 6B, and by reference number 606, prior to initiating the RACH procedure to obtain the grant for uplink transmission, the UE may determine whether a timing alignment timer, associated with the timing alignment of the UE and the BS, is expired. If the timing alignment timer is expired, the UE may discard or reset the timing alignment of the UE and the BS prior to initiating the RACH procedure such that the RACH procedure is performed without a timing alignment. However, if the UE determines that the timing alignment timer has not expired (and thus, the timing alignment of the BS and the UE is still valid), the UE may determine to maintain the timing alignment and to initiate the RACH procedure using the timing alignment.

As further shown in FIG. 6B, and by reference number 608, the UE may initiate the RACH procedure using the timing alignment based at least in part on determining that the timing alignment timer is not expired. In this case, the UE may initiate the RACH procedure by transmitting, to the BS, a RACH communication (e.g., a msg1 communication in a four-step RACH procedure, a msgA communication in the two-step RACH procedure, and/or the like) based at least in part on the timing alignment. For example, the UE may adjust the transmission timing of the RACH communication based at least in part on the timing offset or gap between a downlink and an uplink of the wireless communication link indicated by the timing alignment. Moreover, the UE may adjust a downlink timing for receiving RACH communications from the BS during the RACH procedure.

The UE may select a RACH signature (e.g., a RACH occasion and a RACH preamble in the RACH occasion) associated with the BS for the RACH communication. The RACH signature may be used to uniquely identify the UE during the RACH procedure. In some aspects, the UE may select the RACH occasion from a plurality of RACH occasions configured for the BS. Moreover, the UE may select the RACH preamble from a plurality of RACH preambles configured for the RACH occasion.

In some aspects, when initiating the RACH procedure to obtain the grant for uplink transmission from the BS, the UE may initiate the RACH procedure on a different beam (e.g., a target beam) from a serving beam associated with the BS. In this case, the timing alignment of the BS and the UE may be associated with the serving beam. Accordingly, when the UE initiates the RACH procedure on the target beam, the UE may adjust the timing alignment of the serving beam for the target beam. In this case, the UE may adjust the timing alignment based at least in part on the data structure that the UE maintains for tracking the plurality of beams associated with the BS. For example, the UE may adjust the timing alignment based at least in part on a timing offset between the serving beam and the target beam indicated in the data structure. The UE may adjust the timing alignment by adjusting a downlink timing of the timing alignment based at least in part on the timing offset, by adjusting an uplink timing of the timing alignment based at least in part on the timing offset, and/or the like. In this way, the UE may further increase the accuracy of the timing alignment for the RACH procedure, which may further increase the performance and reliability of the RACH procedure.

In this way, the UE may determine to initiate a RACH procedure with the BS and may determine whether a timing alignment timer, associated with a timing alignment of the UE and the BS, is expired. If the UE determines that the timing alignment timer is not expired, the UE may initiate the RACH procedure using the timing alignment. In this way, the UE and the BS may perform the RACH procedure with the timing alignment, which reduces the likelihood that the BS may not receive a RACH preamble transmitted by the UE, may reduce decoding issues with the RACH preamble, may reduce RAPID mismatches, and/or the like, which may reduce delays in the RACH procedure, may reduce RACH procedure failures, and/or the like. Moreover, maintaining the timing alignment when performing the RACH procedure may improve RACH procedure performance for UEs that are located at or near a cell edge of a BS in that the timing alignment may help mitigate RACH preamble cyclic shift issues that may occur due to large RTTs. In this case, the timing alignment may permit the BS to be configured with larger cell sizes.

As indicated above, FIGS. 6A and 6B are provided as one or more examples. Other examples may differ from what is described with respect to FIGS. 6A and 6B. For example, the actions and techniques described in connection with one or more of reference numbers 602-608 may be performed for RACH procedures in situations other than for obtaining a scheduling request resource. For example, the actions and techniques described in connection with one or more of reference numbers 602-608 may be performed for any RACH procedure in which the UE may already be configured with a timing alignment.

Figure 7:
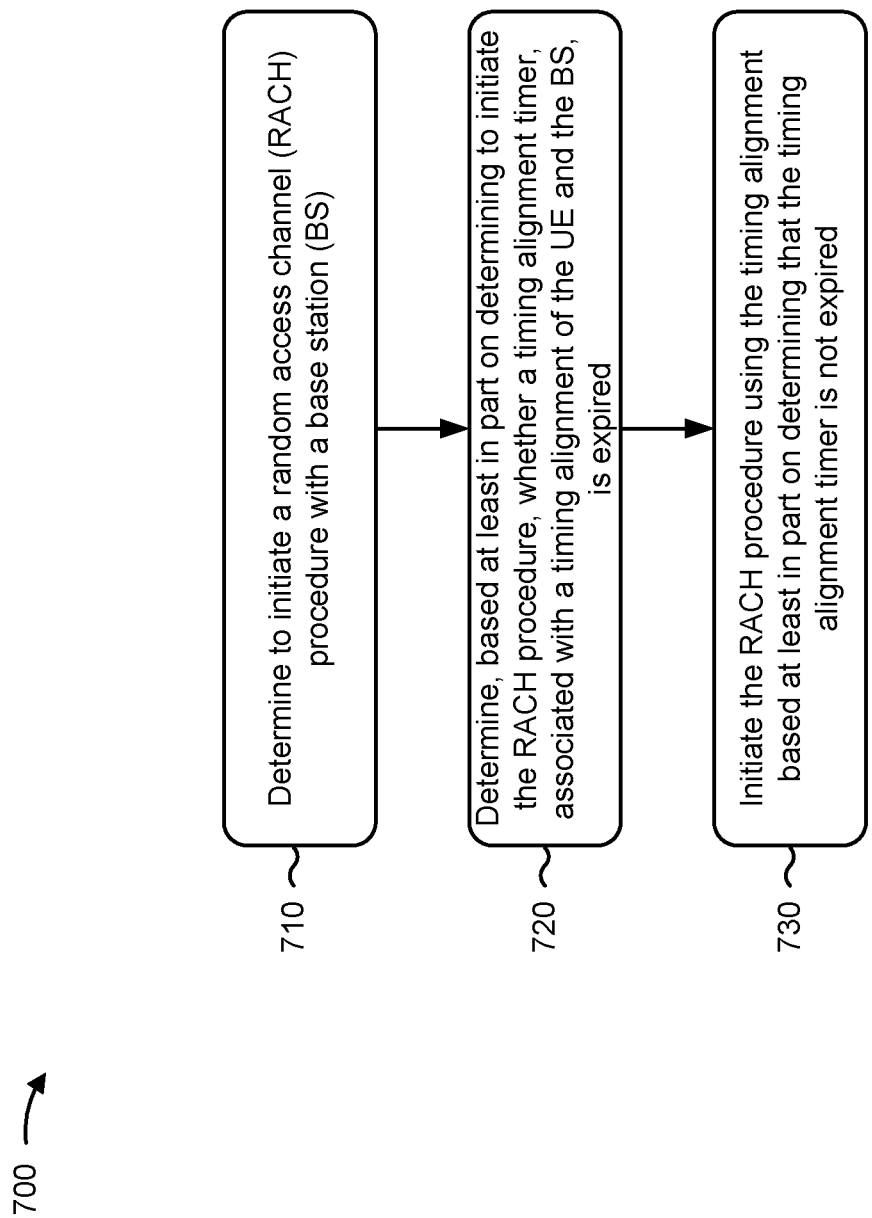
FIG. 7 is a diagram illustrating an example process performed, for example, by a user equipment, in accordance with various aspects of the present disclosure.

FIG. 7 is a diagram illustrating an example process 700 performed, for example, by a UE, in accordance with various aspects of the present disclosure. Example process 700 is an example where a UE (e.g., UE 120) performs operations associated with RACH procedure with timing alignment.

As shown in FIG. 7, in some aspects, process 700 may include determining to initiate a RACH procedure with a BS (block 710). For example, the UE (e.g., using receive processor 258, transmit processor 264, controller/processor 280, memory 282, and/or the like) may determine to initiate a RACH procedure with a base station BS, as described above.

As further shown in FIG. 7, in some aspects, process 700 may include determining, based at least in part on determining to initiate the RACH procedure, whether a timing alignment timer, associated with a timing alignment of the UE and the BS, is expired (block 720). For example, the UE (e.g., using receive processor 258, transmit processor 264, controller/processor 280, memory 282, and/or the like) may determine, based at least in part on determining to initiate the RACH procedure, whether a timing alignment timer, associated with a timing alignment of the UE and the BS, is expired, as described above.

As further shown in FIG. 7, in some aspects, process 700 may include initiating the RACH procedure using the timing alignment based at least in part on determining that the timing alignment timer is not expired (block 730). For example, the UE (e.g., using receive processor 258, transmit processor 264, controller/processor 280, memory 282, and/or the like) may initiate the RACH procedure using the timing alignment based at least in part on determining that the timing alignment timer is not expired, as described above.

Process 700 may include additional aspects, such as any single aspect or any combination of aspects described below and/or in connection with one or more other processes described elsewhere herein.

In a first aspect, determining to initiate the RACH procedure with the BS comprises determining to initiate the RACH procedure based at least in part on determining that the UE is not configured with a scheduling request resource. In a second aspect, alone or in combination with the first aspect, determining to initiate the RACH procedure with the BS comprises determining to initiate the RACH procedure based at least in part on detecting a beam failure associated with a serving beam of the UE. In a third aspect, alone or in combination with one or more of the first and second aspects, initiating the RACH procedure comprises initiating the RACH procedure on a target beam associated with the BS, the serving beam and the target beam being different beams associated with the BS.

In a fourth aspect, alone or in combination with one or more of the first through third aspects, process 700 further comprises selecting the target beam, from a plurality of candidate beams associated with the BS, based at least in part on the target beam satisfying one or more thresholds. In a fifth aspect, alone or in combination with one or more of the first through fourth aspects, the timing alignment is associated with the serving beam, and initiating the RACH procedure on the target beam comprises adjusting the timing alignment based at least in part on a timing offset between the serving beam and the target beam.

In a sixth aspect, alone or in combination with one or more of the first through fifth aspects, adjusting the timing alignment comprises adjusting a downlink timing of the timing alignment based at least in part on the timing offset. In a seventh aspect, alone or in combination with one or more of the first through sixth aspects, initiating the RACH procedure on the target beam comprises transmitting a RACH preamble, in a msg1 communication or a msgA communication of the RACH procedure, using the adjusted timing alignment.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    determining, based at least in part on a beam failure associated with a serving beam associated with the UE, to initiate a random access channel (RACH) procedure with a base station (BS);
    initiating, based at least in part on receiving an indication of a timing alignment from the BS, a timing alignment timer associated with the timing alignment, wherein the timing alignment identifies a timing offset or a gap between a downlink and uplink of a wireless communication link between the UE and the BS;
    determining, based at least in part on determining to initiate the RACH procedure, whether the timing alignment timer is expired; and
    initiating the RACH procedure on a target beam, associated with the UE and different from the serving beam, using the timing alignment based at least in part on determining that the timing alignment timer is not expired.

2. The method of claim 1, wherein determining to initiate the RACH procedure with the BS comprises:
    determining to initiate the RACH procedure based at least in part on the beam failure and determining that the UE is not configured with a scheduling request resource.

3. The method of claim 1, wherein determining to initiate the RACH procedure with the BS comprises:
    determining to initiate the RACH procedure based at least in part on detecting the beam failure.

4. The method of claim 1, further comprising:
    selecting the target beam, from a plurality of candidate beams associated with the BS, based at least in part on the target beam satisfying one or more thresholds.

5. The method of claim 1, wherein the timing alignment is associated with the serving beam; and
    wherein initiating the RACH procedure on the target beam comprises:

adjusting the timing alignment based at least in part on a second timing offset between the serving beam and the target beam.

6. The method of claim 5, wherein adjusting the timing alignment comprises:
adjusting a downlink timing of the timing alignment based at least in part on the second timing offset.

7. The method of claim 5, wherein initiating the RACH procedure on the target beam comprises:
transmitting a RACH preamble, in a msg1 communication or a msgA communication of the RACH procedure, using the adjusted timing alignment.

8. The method of claim 1, further comprising
maintaining or resetting, based on determining whether the timing alignment timer is expired, the timing alignment,
wherein initiating the RACH procedure on the target beam using the timing alignment is based at least in part on maintaining or resetting the timing alignment.

9. A user equipment (UE) for wireless communication, comprising:
a memory; and
one or more processors coupled to the memory, the one or more processors configured to:
determine, based at least in part on a beam failure associated with a serving beam associated with the UE, to initiate a random access channel (RACH) procedure with a base station (BS);
initiate, based at least in part on receiving an indication of a timing alignment from the BS, a timing alignment timer associated with the timing alignment, wherein the timing alignment identifies a timing offset or a gap between a downlink and uplink of a wireless communication link between the UE and the BS;
determine, based at least in part on determining to initiate the RACH procedure, whether the timing alignment timer is expired; and
initiate the RACH procedure on a target beam, associated with the UE and different from the serving beam, using the timing alignment based at least in part on determining that the timing alignment timer is not expired.

10. The UE of claim 9, wherein, to determine to initiate the RACH procedure with the BS, the one or more processors are to:
determine to initiate the RACH procedure based at least in part on the beam failure and determining that the UE is not configured with a scheduling request resource.

11. The UE of claim 9, wherein, to determine to initiate the RACH procedure with the BS, the one or more processors are to:
determine to initiate the RACH procedure based at least in part on detecting the beam failure.

12. The UE of claim 9, wherein the one or more processors are further configured to:
select the target beam, from a plurality of candidate beams associated with the BS, based at least in part on the target beam satisfying one or more thresholds.

13. The UE of claim 9, wherein the timing alignment is associated with the serving beam; and
wherein to initiate the RACH procedure on the target beam, are to:
adjust the timing alignment based at least in part on a second timing offset between the serving beam and the target beam.

14. The UE of claim 13, wherein, to adjust the timing alignment, the one or more processors are to:
adjust a downlink timing of the timing alignment based at least in part on the timing offset.

15. The UE of claim 13, wherein, to initiate the RACH procedure on the target beam, the one or more processors are to:
transmit a RACH preamble, in a msg1 communication or a msgA communication of the RACH procedure, using the adjusted timing alignment.

16. The UE of claim 9, wherein the memory and the one or more processors are further configured to:
maintain or reset, based on determining whether the timing alignment timer is expired, the timing alignment,
wherein the one or more processors, when initiating the RACH procedure on the target beam, are to:
initiate the RACH procedure on the target beam using the timing alignment is based at least in part on maintaining or resetting the timing alignment.

17. A non-transitory computer-readable medium storing one or more instructions for wireless communication, the one or more instructions comprising:
one or more instructions that, when executed by one or more processors of a user equipment (UE), cause the one or more processors to:
determine, based at least in part on a beam failure associated with a serving beam associated with the UE, to initiate a random access channel (RACH) procedure with a base station (BS);
initiate, based at least in part on receiving an indication of a timing alignment from the BS, a timing alignment timer associated with the timing alignment, wherein the timing alignment identifies a timing offset or a gap between a downlink and uplink of a wireless communication link between the UE and the BS;
determine, based at least in part on determining to initiate the RACH procedure, whether the timing alignment timer is expired; and
initiate on a target beam, associated with the UE and different from the serving beam, the RACH procedure using the timing alignment based at least in part on determining that the timing alignment timer is not expired.

18. The non-transitory computer-readable medium of claim 17, wherein the one or more instructions, that cause the one or more processors to determine to initiate the RACH procedure with the BS, cause the one or more processors to:
determine to initiate the RACH procedure based at least in part on the beam failure and determining that the UE is not configured with a scheduling request resource.

19. The non-transitory computer-readable medium of claim 17, wherein the one or more instructions, that cause the one or more processors to determine to initiate the RACH procedure with the BS, cause the one or more processors to:
determine to initiate the RACH procedure based at least in part on detecting the beam failure.

20. The non-transitory computer-readable medium of claim 17, wherein the one or more instructions, when executed by the one or more processors, further cause the one or more processors to:
select the target beam, from a plurality of candidate beams associated with the BS, based at least in part on the target beam satisfying one or more thresholds.

21. The non-transitory computer-readable medium of claim 17, wherein the timing alignment is associated with the serving beam; and
wherein the one or more instructions, that cause the one or more processors to initiate the RACH procedure on the target beam, cause the one or more processors to:
adjust the timing alignment based at least in part on a second timing offset between the serving beam and the target beam.

22. The non-transitory computer-readable medium of claim 21, wherein the one or more instructions, that cause the one or more processors to adjust the timing alignment, cause the one or more processors to:
adjust a downlink timing of the timing alignment based at least in part on the timing offset.

23. The non-transitory computer-readable medium of claim 21, wherein the one or more instructions, that cause the one or more processors to initiate the RACH procedure on the target beam, cause the one or more processors to:
transmit a RACH preamble, in a msg1 communication or a msgA communication of the RACH procedure, using the adjusted timing alignment.

24. The non-transitory computer-readable medium of claim 17, wherein the one or more instructions, when executed by the one or more processors, further cause the one or more processors to:
maintain or reset, based on determining whether the timing alignment timer is expired, the timing alignment,
wherein the one or more instructions, that cause the one or more processors to initiate the RACH procedure on the target beam, cause the one or more processors to:
initiate the RACH procedure on the target beam using the timing alignment is based at least in part on maintaining or resetting the timing alignment.

25. An apparatus for wireless communication, comprising:
means for determining to initiate a random access channel (RACH) procedure with a base station (BS);
means for initiating, based at least in part on receiving an indication of a timing alignment from the BS, a timing alignment timer associated with the timing alignment, wherein the timing alignment identifies a timing offset or a gap between a downlink and uplink of a wireless communication link between the apparatus and the BS;
means for determining, based at least in part on determining to initiate the RACH procedure based at least in part on a beam failure associated with a serving beam associated with the apparatus, whether the timing alignment timer is expired; and
means for initiating the RACH procedure on a target beam, associated with the apparatus and different from the serving beam, using the timing alignment based at least in part on determining that the timing alignment timer is not expired.

26. The apparatus of claim 25, wherein the means for determining to initiate the RACH procedure with the BS comprises:
means for determining to initiate the RACH procedure based at least in part on the beam failure recover and determining that the apparatus is not configured with a scheduling request resource.

27. The apparatus of claim 25, wherein the means for determining to initiate the RACH procedure with the BS comprises:
means for determining to initiate the RACH procedure based at least in part on detecting the beam failure.

28. The apparatus of claim 25, further comprising:
means for selecting the target beam, from a plurality of candidate beams associated with the BS, based at least in part on the target beam satisfying one or more thresholds.

29. The apparatus of claim 25, wherein the timing alignment is associated with the serving beam; and
wherein the means for initiating the RACH procedure on the target beam comprises:
means for adjusting the timing alignment based at least in part on a second timing offset between the serving beam and the target beam.

30. The apparatus of claim 25, further comprising:
means for maintaining or resetting, based on determining whether the timing alignment timer is expired, the timing alignment,
wherein the means for initiating the RACH procedure on the target beam using the timing alignment is based at least in part on the means for maintaining or resetting the timing alignment.

* * * * *